Figure 1:
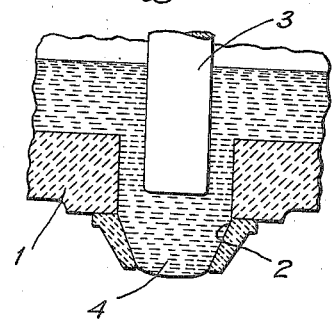

April 7, 1936.  W. T. HONISS  2,036,871
METHOD OF FORMING PARISONS FOR BOTTLES AND SIMILAR ARTICLES
Filed Nov. 1, 1934   2 Sheets-Sheet 1

Witness:
A. A. Horn

Inventor:
William T. Honiss
by Brown & Parham
Attorneys.

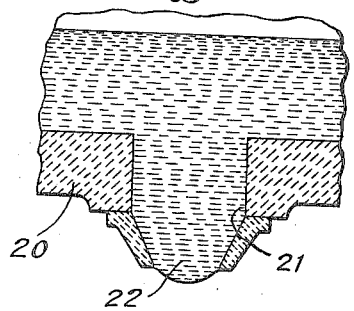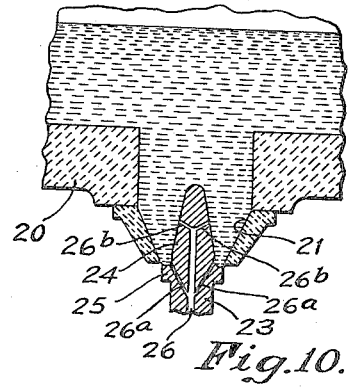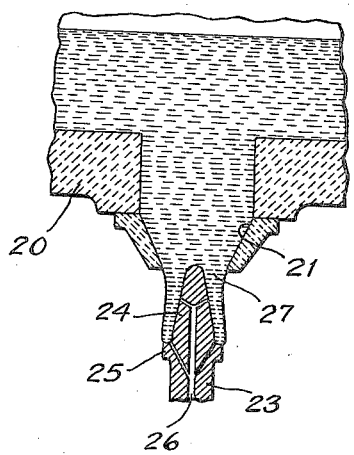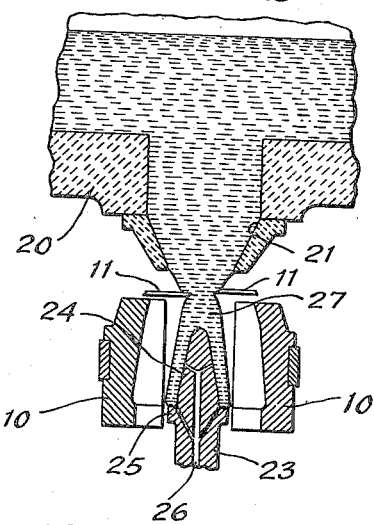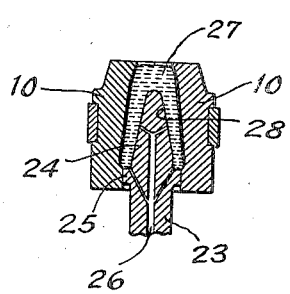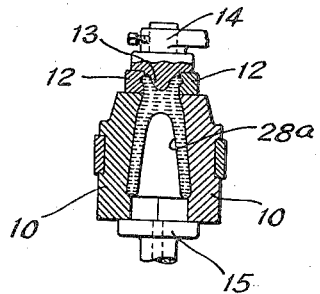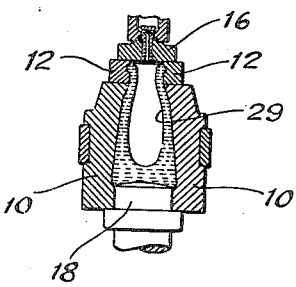

Patented Apr. 7, 1936

2,036,871

UNITED STATES PATENT OFFICE 2,036,871

METHOD OF FORMING PARISONS FOR BOTTLES AND SIMILAR ARTICLES

William T. Honiss, West Hartford, Conn., assignor to Hartford-Empire Company, Hartford, Conn., a corporation of Delaware Application November 1, 1934, Serial No. 750,932

9 Claims. (Cl. 49—80)

This invention relates generally to methods of manufacturing bottles, jars and similar articles from charges produced by a glass feeder and more particularly to methods of forming such articles so that their side walls will be practically free from wavy or relatively thick portions.

It has been proposed, as disclosed in Patent 1,945,985, granted Feb. 6, 1934, to A. E. Smith, assignor to the Hartford-Empire Company, and in Patent 1,945,983, granted on the same date to G. E. Rowe, assignor to the same company, to obviate wavy portions in the side walls of bottles and similar articles of hollow glassware that have been formed from feeder-fed charges. According to such proposals, charges produced by a feeder are delivered to inverted parison molds and cavities are produced in the upper end portions of the glass masses in the inverted molds, specifically by thrusting a cavity-forming plunger downwardly into such masses and then withdrawing the plunger. These cavities are subsequently practically eliminated by a counterblowing operation as air is forced into the neck portion of the glass parison.

A parison formed in this manner may subsequently be expanded in a final blow mold by blowing pressure applied to the interior thereof to form a bottle or similar article of glassware that will have side walls practically free from waviness or so-called "counterblow waves" or "settle blow waves". Both of these terms have been used in the art to designate the relatively thick and adjacent thinner portions of side walls of bottles and the like, but the latter term, i. e., "settle-blow waves" is believed to be the more apt expression and will be used hereinafter in this specification.

An object of the present invention is to form in a novel manner a glass parison which will be adapted to be expanded to final form in a blow mold to form an article free from "settle blow waves", as in the case of the parisons of the disclosures of the aforesaid Smith and Rowe patents.

A further object of the invention is to provide a method by which a cavity in the bottom end of a parison that is intended to be further expanded into a bottle or like article of glassware will be produced during the production of the charge mass of which the parison consists and before the separation of such mass from a parent body of molten glass.

A further object of the invention is a provision of a method of the character described by which a glass parison of the kind hereinbefore referred to will be produced and will be given the desired external and internal contours in an upright parison mold without the necessity of inverting and subsequently reverting the parison mold during the operation of forming such a parison.

A further object of the invention is the provision of a method of forming a parison of the character hereinbefore referred to so that a cavity will be produced in the bottom end of the glass mass of which such parison is being formed before contact of any portion of such glass mass with a wall of the blank mold in which the formation of the parison will be completed.

Other objects and advantages of the invention will hereinafter be pointed out or will become apparent from the following description of two illustrative series of steps for carrying out the invention, as disclosed in the accompanying drawings, in which:

Figures 1 to 6 inclusive are fragmentary more or less diagrammatic vertical sectional views of different steps or stages in the operation of forming a parison according to the invention by the use of a feeder of the reciprocating plunger type in conjunction with certain instrumentalities, including an elongate vertically movable cavity-forming tool and a parison mold; and Figs. 7 to 13 inclusive likewise are fragmentary more or less diagrammatic vertical sectional views of different steps or stages in the production of a similar parison by the use of a feeder of the flowing stream type, in conjunction with particular instrumentalities, including a somewhat different movable cavity-forming tool and the parison mold.

According to the invention, generally described, an elongate cavity-forming tool of generally rod-like character is thrust vertically upward in line with the submerged discharge outlet of a glass feeder at such time and in such manner that the cavity-forming end of this tool extends into the glass in or adjacent to the discharge outlet shortly after, at or before the beginning of issuance of glass from the outlet for the formation of a mass of glass sufficient for the parison desired.

This tool may be moved downward in line with the outlet while it remains in cavity-forming contact with the glass until a predetermined amount of glass has issued from the outlet and is disposed between the cavity-forming tool and the outlet.

The halves of the body of a parison mold may be closed around this glass, so as also to encircle the cavity forming tool. This may be done while the tool is still in contact with the glass or after such tool has been withdrawn downwardly out of contact with such glass. The parison mold body should be of suitable internal contour to give support to the lower end of the annular portion of glass surrounding the cavity that has been formed by the cavity-forming tool.

The glass in the closed parison mold body may be severed from the glass at or slightly below the outlet, at a time that preferably coincides approximately with the closing of the halves of the body of the parison mold which may be shortly before or shortly after the closing of such mold parts. The cavity-forming tool is then withdrawn downwardly, if this has not already been done, leaving in the closed parison mold body a separated compact glass charge or blank having a cavity in its bottom end.

The parison mold body preferably is moved laterally from beneath the feeder outlet as soon as conditions will permit to allow the use of the cavity-forming tool as above described in the formation of a charge or blank for the next parison.

A neck ring structure, including a neck pin, or projection, may be disposed on the closed parison mold body and pressure may be applied from beneath, as by air from a suitable blow head, so as slightly to enlarge the bottom cavity and at the same time to force sufficient glass from the interior of the glass blank or body of the parison mold into the neck ring to form the neck finish portion of the parison. The neck pin or neck cavity-forming implement then may be removed, a counterblow head applied to the closed neck ring and the glass in the parison mold counterblown by pressure applied to the neck cavity, thereby eliminating the bottom cavity and producing a counterblown parison which subsequently may be expanded in an ordinary way in a final blow mold to form a bottle or similar article of hollow glassware, the side walls of which will be practically free from "settle blow waves". During the counterblowing operation, a suitable baffle or bottom plate may be applied to the bottom end of the closed parison mold body.

The description that has been given so far is general and the particular steps in the production of a parison, as well as the instrumentalities employed, may be varied according to preference or different service conditions or requirements at different times. Two specifically different methods, both within the purview of the invention, will now be described:

The first of these specific methods may be carried on by the use of a suspended charge feeder, a fragmentary portion of which is shown in Figs. 1 to 4 inclusive. The glass feed container or forehearth, indicated at 1, of such a feeder is provided with a bottom feed outlet 2, with which a vertically reciprocating plunger 3 is associated. The downward stroke of the plunger 3 may be employed to accelerate discharge of glass from the outlet 2 while the upward stroke of the plunger may be employed to retard or stop discharge of glass from the outlet or to retract into the outlet the stub of glass that remains after a mass of issued glass has been severed from the glass at or slightly below the outlet.

Figure 2:
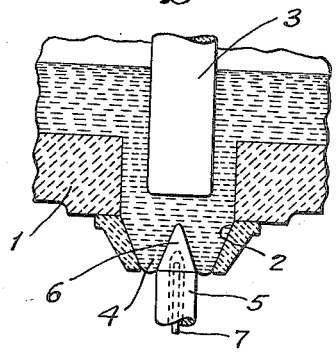

In Fig. 1, the glass stub, designated 4, has been retracted by an upward movement of the plunger 3 so that the lower end of this stub is not appreciably below the lower end of the outlet. At this time, an elongate vertically disposed cavity-forming tool 5 may be projected upwardly in line with the outlet until the tip portion 6 of such tool has been thrust into the glass stub in the outlet, as indicated in Fig. 2. The tip portion of the tool 5 is pointed or substantially conical, in the example shown in the drawings, although the shape thereof may be varied as desired. Preferably this tool is cooled, as by circulating a cooling fluid through the interior thereof, with a view to keeping the tip portion of the tool sufficiently cool so that the glass will not adhere thereto, but not so cold as to cause undesirable chilling of such glass. In Fig. 2, a cooling tube within the tool 5 is indicated at 7, the showing of the cooling means being more or less diagrammatic, as any cooling desired may be effected in any suitable known manner.

Figure 3:
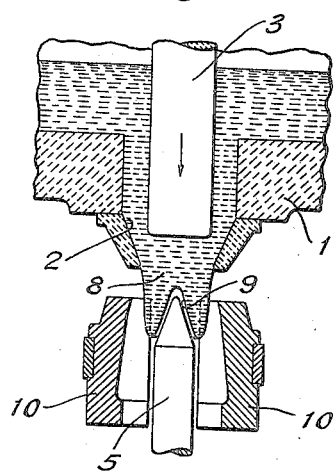

At the stage of operations illustrated in Fig. 3, the feeder plunger 3 is moving downward as is a column of glass, designated 8, that has issued from the outlet. The cavity forming tool 5 also has been moved downward in axial alignment with the outlet, first at a speed sufficiently slow to maintain the tip portion of the tool in contact with glass of the downwardly moving lower end portion of the column 8 and subsequently at an increased speed so as to withdraw the tool 5 from contact with the column of glass, leaving a cavity in the bottom or lower end portion thereof. As shown in Fig. 3, the lower end portion of the glass column 8, with the cavity 9 therein, has descended between the open halves 10 of a parison mold body and the tool 5 has just started to move away from the glass column. The time of withdrawal of the tool 5 from the glass column may be selected with respect to the closing of the halves of the parison mold body so as to take place at a time most desirable under any given set of operating conditions. The downward movement of the plunger 3 has accelerated discharge of glass from the outlet so that the descending glass column has a substantial area in cross section at any place on its length and has been given a predetermined desirable shape.

Figure 4:
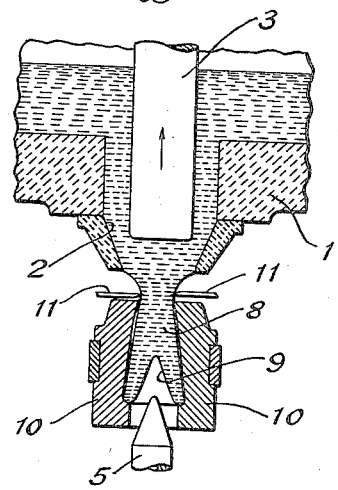

As shown in Fig. 4, the halves of the mold body have been closed about the portion of the glass column 8 therein and the annular portion of glass surrounding and defining the cavity 9 is supported at its lower end on a suitable shoulder or sloping internal wall of the parison mold type. The walls of the cavity 9 may have reheated somewhat but are still sufficiently stiff to prevent collapse thereof. The feeder plunger 3 may be moved upward to retract the glass at the outlet so as to attenuate the glass above the level of the mold body. Shears, represented by the blades 11 in Fig. 4, may be closed to sever the glass charge or blank in the parison mold body from the glass at the outlet, leaving a new stub which will form the lower end portion of the succeeding column from which a further charge or blank is to be obtained. The cavity-forming tool is shown in Fig. 4 just before its top has descended below the lower end of the parison mold body as the shear blades are shown just as they are about to close. Preferably the closing of the halves of the parison mold body, the closing of the shear blades, and the beginning of the upward movement of the feeder plunger are substantially simultaneous but they may be timed differently, if desirable. The parison mold body with the glass blank therein may be swung laterally of the outlet so as to permit the tool 5 to be raised into cavity-forming contact with the glass of the new stub.

Figure 5:
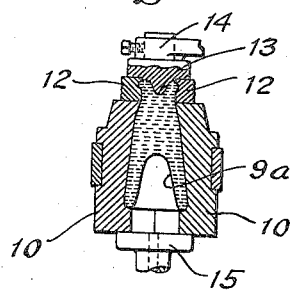

In the meantime, the parison mold body may be supplemented at its top by the closed halves 12 of a neck ring portion of the parison mold and by a suitable neck pin 13 and a neck pin carrier 14, all as shown in Fig. 5. Also, a suitable pressure applying means, such as a blow head 15, may be applied to the bottom end of the parison mold body and air may be forced into the bottom cavity of the glass blank so as slightly to enlarge the latter, as to the shape indicated at 9a in Fig. 5, and also to force glass from the interior of the glass blank in the parison mold body into the closed neck ring and around the neck pin 13 so as to form the neck finish portion of the parison.

Figure 6:
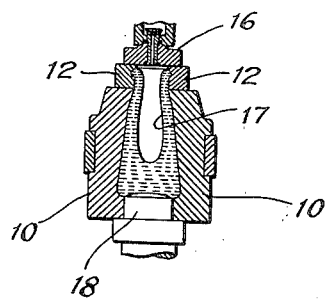

After the neck finish portion of the parison has been formed, as illustrated in Fig. 5, a subsequent operation eliminates or obliterates the cavity 9a and produces a hollow parison that is adapted to be further expanded in a final blow mold in an ordinary manner to produce a bottle or other article of glassware that will be free from settle-blow waves. Such a parison is shown in Fig. 6 and has been produced by withdrawing the neck pin 3 and counterblowing the glass blanks in the closed parison mold, as by air from a counterblow head 16 applied to the neck aperture left by the withdrawal of the neck pin 13. This counterblowing operation displaces an internal portion of the glass blank in the mold so as to obliterate the bottom cavity 9a, shown in Fig. 5, and to replace it with an internal cavity, indicated at 17 in Fig. 6, that opens through the neck finish portion of the parison. During the counterblowing operation, a suitable bottom plate or baffle, such as that indicated at 18, Fig. 6, may be applied to the bottom end of the parison mold so as to aid in shaping the bottom of the counterblown parison.

In lieu of a reciprocating feeder plunger periodically to accelerate and periodically to retard the glass at and adjacent to the outlet, other known means, such as a reciprocating air plunger or a periodically varied air pressure, may be employed to apply suitable glass discharge accelerating and/or glass discharge retarding or retracting impulses to the glass at the outlet.

According to the specific series of operations, shown in Figs. 7 to 13 inclusive, the glass required for each parison may be obtained from a feeder of the flowing stream type. The container or forehearth of such a feeder is indicated at 20 in Fig. 7 and the outlet thereof is indicated at 21. Such a feeder may have a stationary valve means (not shown) for regulating flow through the outlet 21 but ordinarily would not have any means for imparting impulse to the glass at or above the outlet so as periodically to vary flow therethrough.

At the stage of operation shown in Fig. 7, the lower end 22 of a stream of glass of substantial area in cross section is just commencing to issue from the outlet.

Before such stream has obtained any substantial length, a suitable cavity-forming tool, indicated at 23 in Fig. 8, is moved vertically upward until its tip portion 24 has been thrust into the glass in the outlet passage. Preferably this tool 23 also has a flange or skirt 25 that is located at a predetermined distance from its extremity and which is adapted to approach sufficiently close to the lower end of the outlet structure to cooperate with the latter practically to stop issuance of glass from the outlet when the tool 23 is in a position substantially as shown in Fig. 8.

The tool 23 preferably has a bore 26 adapted for connection with a source of suction or subatmospheric air pressure and provided with branches, such as indicated at 26a and 26b, opening through the outer walls of the tip portion of the tool. The glass adjacent to the tip portion of the tool thus may be held in contact therewith by suction. When the tool is moved axially downward in line with the outlet, it may aid in drawing quickly from the outlet a glass column of glass of the size and shape desired. A portion of the column so being produced is indicated at 27 in Fig. 9.

At the stage of operation illustrated in Fig. 10, the tool 23 has been moved downwardly between the open halves 10 of the parison mold body. In effecting this movement of the tool and the formation of the glass column 27, the latter portion of the downward movement of the tool may have been at a sufficiently high speed to effect attenuation of the glass at a point between the plane of the upper end of the parison mold body and the outlet. Shears, represented by the blades 11, may be closed to cut this attenuated portion of glass and temporarily to support the stub of glass above the severing plane.

As shown in Fig. 11, the halves of the parison mold body have closed and the lower end of the annulus of glass surrounding the tip 24 of the tool 23 is supported in part at its lower end by the internal shoulder or sloping wall of the parison mold body. Suction having been discontinued from the bore 26 of the tool 23, the latter is withdrawn so as to leave the glass charge or blank in the closed parison mold body, such glass charge or blank having a bottom cavity 28 therein. The closed parison mold body preferably will be swung laterally out of line with the feeder outlet. The tool 23 then may be raised vertically, substantially to the position shown in Fig. 8, the shear blades 11 having been opened to permit such operation. During the final portion of its upward movement, the tip portion of the tool 23 may raise the glass stub into the outlet for reheating thereof, as shown in Fig. 8.

The subsequent operations in the formation of a hollow parison of the character described may be substantially as have already been described in connection with the showings of Figs. 5 and 6. Thus, the halves 12 of the neck ring portion of the parison mold may be disposed at the upper end of the parison mold body, together with the associated neck pin 13 and neck pin carrier 14. Air from the blow head 15 may be applied to the bottom cavity 28 to enlarge it somewhat, as to the contour indicated at 28a, and to displace upwardly an internal portion of the glass blank from the parison mold body into the neck ring and around the neck pin so as to form the neck finish portion of the parison. The result of such operation is as shown in Fig. 12. Subsequently, the neck pin may be removed and replaced by the counterblow head 16 for the counterblowing operation by which the bottom cavity 28a is obliterated and is replaced by an internal cavity 29, substantially as shown in Fig. 13. During this counterblowing operation, a bottom plate 18 may be disposed in cooperative relation with the bottom or lower end portion of the parison mold body.

Various known mechanisms and instrumentalities may be employed in performing the invention. The method of such invention also may be varied as to the character, order and relative times of occurrence of the component steps thereof without departing from the spirit and scope of the invention, which is not to be limited beyond the terms of the appended claims.

I claim:

1. In the manufacture of articles of hollow glassware, the method which comprises superimposing a supply body of molten glass on a glass feed outlet, forming an open-bottomed cavity in the glass at said outlet by thrusting a cavity-forming implement into such glass, moving the cavity-forming implement downwardly in line with said outlet and in contact with said glass until at least part of the glass for the glass blank desired has issued from said outlet, removing the cavity-forming implement from the issued glass, leaving said open-bottomed cavity in the lower end portion thereof, cutting off the hollow-ended blank thus produced at a plane adjacent to the outlet when sufficient glass for the blank desired has passed below a severing plane, and obliterating said cavity and producing a hollow parison by introducing air under pressure into the blank at the end of the latter opposite to that containing said cavity.

2. In the manufacture of articles of hollow glassware, the method which comprises superimposing a supply body of molten glass on a glass feed outlet, forming an open-bottomed cavity in the glass at said outlet by thrusting a cavity-forming implement into such glass, moving the cavity-forming implement downwardly in line with said outlet and in contact with said glass until at least part of the glass for the glass blank desired has issued from said outlet, removing the cavity-forming implement from the issued glass, leaving said open-bottomed cavity in the lower end portion thereof, cutting off the hollow-ended blank thus produced when sufficient glass for the blank desired has passed below a severing plane, confining and supporting said blank in a parison mold while said open-bottomed cavity therein persists, and obliterating said cavity and producing a hollow parison by introducing air under pressure into the glass blank in the parison mold at the end of said blank opposite to that containing said cavity.

3. In the manufacture of bottles and similar articles of hollow glassware, the method which comprises superimposing a supply body of molten glass on a feed outlet, thrusting a portion of an elongate cavity forming implement vertically upward into the glass at said outlet, moving said implement downward in line with said outlet and in contact with said glass until a substantial mass of glass has issued from the outlet, withdrawing said implement from the issued glass after its contact therewith has formed an open-bottomed cavity in the lower end portion of such glass, cutting off a hollow-ended blank thus produced by severing the issued glass at a plane adjacent to the outlet and above the upper end of said open-bottomed cavity, supporting and confining said hollow-ended blank in a parison mold, forming a neck finish portion of a parison at the upper end of the hollow-ended glass blank, and obliterating said open-bottomed cavity and producing a hollow glass parison by applying counterblowing air pressure to the interior of the blank through said neck finish portion of the parison.

4. In the manufacture of bottles and similar articles of hollow glassware, the method which comprises superimposing a supply body of molten glass on a feed outlet, thrusting the upper end portion of a vertical elongate cavity-forming tool into the glass at said outlet, moving said tool downward in line with said outlet and in contact with said glass until a substantial mass of glass has issued from said outlet, withdrawing said tool from contact with the issued glass, leaving an open-bottomed cavity in the lower end portion of the issued glass, separating a hollow-ended glass blank from the issued glass by severing said issued glass at a plane adjacent to the outlet and above the upper end of said open-bottomed cavity, confining and supporting said hollow-ended glass blank in a parison mold body, disposing a neck ring having a removable neck pin therein upon said parison mold body, applying pressure to the interior of said open-bottomed cavity to force glass from the interior of the hollow blank upwardly into said neck ring and around the neck pin therein so as to form the neck finish portion of a glass parison, removing the neck pin, and applying counterblowing air pressure to the aperture left by the removal of said neck pin to displace an internal portion of the glass blank as required to obliterate said open-bottomed cavity and to produce a hollow glass parison, substantially as and for the purpose described.

5. In the manufacture of bottles and similar articles of hollow glassware, the method which comprises superimposing a supply body of molten glass on a feed outlet, thrusting the upper end portion of a vertical elongate cavity-forming tool into the glass at said outlet, moving said tool downward in line with said outlet and in contact with said glass until a substantial mass of glass has issued from said outlet, withdrawing said tool from contact with the issued glass, leaving an open-bottomed cavity in the lower end portion of the issued glass, separating a hollow ended glass blank from the issued glass by closing shear blades through the same at a plane adjacent to the outlet and above the upper end of said open-bottomed cavity, confining and supporting said hollow-ended glass blank in a parison mold body, disposing a neck ring having a removable neck pin therein upon said parison mold body, applying pressure to the interior of said open-bottomed cavity to force glass from the interior of the hollow blank upwardly into said neck ring and around the neck pin therein so as to form the neck finish portion of a glass parison, removing the neck pin, applying a bottom plate to the body of said parison mold and applying counterblowing pressure to the aperture left by the removal of said neck pin to displace an internal portion of the glass blank against said bottom plate as required to obliterate said open-bottomed cavity and to produce a hollow glass parison, substantially as and for the purpose described.

6. In the manufacture of bottles and similar articles of hollow glassware, the method of producing a hollow ended blank which comprises superimposing a supply body of molten glass on a discharge outlet, controlling discharge of glass from said outlet by periodic discharge accelerating and periodic glass discharge retarding impulses applied to the glass above the outlet, thrusting the upper end portion of a vertical cavity-forming tool into the glass at the outlet, moving said tool downwardly in line with the outlet and in contact with the issuing glass while accelerating discharge from the outlet to shape the glass between said tool and said outlet, removing said tool from contact with said glass when a preshaped mass of glass of substantial size has issued from the outlet, closing the halves of the body of a parison mold about the issued glass so as to support and encompass the portion thereof that has said open-bottomed cavity therein, applying a glass discharge retracting impulse to the glass above said outlet to attenuate the glass between said parison mold body and the outlet, and cutting through said attenuated portion of the issued glass to separate the glass in said parison mold body from the supply body, and repeating said operations to produce a series of similar hollow-ended glass mold charges or blanks.

7. In the manufacture of bottles and similar articles of hollow glassware, the method of producing a series of similar hollow ended glass mold charges or blanks, comprising the steps of superimposing a supply body of molten glass on an open discharge outlet, thrusting the upper end portion of a vertical cavity-forming tool into the glass in said outlet at the beginning of issuance of a stream of glass therefrom, temporarily restricting issuance of glass from the outlet by bringing a peripheral portion of said tool sufficiently close to the lower end of said outlet to prevent flow from the latter, applying suction to the glass in contact with the upper end portion of said tool through an internal passage in said tool, moving said tool downwardly in line with the outlet while continuing said suction on the glass in contact with the upper end portion of the tool so as to aid in drawing glass downwardly through and from said outlet to produce a mold charge mass of issued glass of the size desired, cutting through the issued glass at a plane adjacent to said outlet and substantially above the place of contact of said tool with said glass, closing the halves of the body of a parison mold about the glass below the severing plane, discontinuing said suction through said tool and removing the tool from contact with the glass, leaving a hollow-ended glass mold charge or blank within the body of said parison mold, removing the closed parison body mold and the glass therein from beneath said outlet, thrusting said cavity forming tool upward into the glass stub above the severing plane to support the same and to raise it into the outlet as a step in producing the succeeding hollow-ended glass mold charge or blank, and repeating said series of steps.

8. In the manufacture of bottles or similar articles of hollow glassware, the method which comprises causing molten glass to issue from a feed outlet in a descending column, forming an open-bottomed axial cavity in the lower end of the glass column before the same has had contact at its lateral surface with any glass chilling surface, severing glass of said column while said open-bottomed axial cavity remans to produce a hollow-ended blank, and obliterating said cavity and producing a hollow parison by introducing air under pressure into said blank at the end of the latter opposite to that containing said cavity.

9. In the manufacture of bottles or similar articles of hollow glassware, the method which comprises causing molten glass to issue from a feed outlet in a descending column, forming an open-bottomed axial cavity in the lower end of the glass column before the same has had contact at its lateral surface with any glass chilling surface, severing glass of said column while said open-bottomed axial cavity remains to produce a hollow-ended blank, forming the end portion of said blank remote from its hollow end into the neck finish portion of a parison, and counterblowing glass of said blank to obliterate the cavity of said hollow end thereof and to produce a parison having an internal cavity open at the neck finish end thereof.

WILLIAM T. HONISS.